United States Patent
Kang et al.

(10) Patent No.: US 6,928,880 B2
(45) Date of Patent: Aug. 16, 2005

(54) HIGH PRESSURE SENSOR

(75) Inventors: Philip Kang, Northbrook, IL (US); Robert C. Kosberg, Wildwood, IL (US); Daniel J. Bratek, Palatine, IL (US); Eleanor B. Dayrit, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 10/700,170

(22) Filed: Nov. 3, 2003

(65) Prior Publication Data
US 2005/0092093 A1 May 5, 2005

(51) Int. Cl.⁷ .................................................. G01L 7/00
(52) U.S. Cl. ........................................ 73/756; 73/431
(58) Field of Search ..................... 73/754, 431, 700, 73/756

(56) References Cited

U.S. PATENT DOCUMENTS

| | | | |
|---|---|---|---|
| 2,618,978 A * | 11/1952 | Ragland | 73/756 |
| 2,679,411 A | 5/1954 | Moore | |
| 3,595,584 A * | 7/1971 | Camras | 360/55 |
| 4,005,847 A * | 2/1977 | Ekman | 251/148 |
| 4,901,761 A * | 2/1990 | Taylor | 137/557 |
| 5,119,680 A * | 6/1992 | Myhre | 73/756 |

FOREIGN PATENT DOCUMENTS

EP          1 146 326 A2      10/2001

* cited by examiner

Primary Examiner—William Oen
Assistant Examiner—Andre Allen
(74) Attorney, Agent, or Firm—James A. Lamb

(57) ABSTRACT

A high pressure sensor mounting configuration (100) includes a cylindrical pressure sensor cavity (105), an internally threaded collet (170), and a housing (160). The cylindrical pressure sensor cavity includes a convex conical open end and a first bearing surface (115). The internally threaded collet includes a second bearing surface (175) that bears on the first bearing surface when the internally threaded collet is threaded onto a pressure port (140), causing the convex conical open end (110) to bear on a concave conical mating surface of the pressure port. The housing captures the collet on the pressure sensor cavity.

6 Claims, 1 Drawing Sheet

HIGH PRESSURE SENSOR

BACKGROUND

High pressure sensors used in diesel automotive fuel injection line applications must seal pressures up to 1800 Bar, and should provide for flexibility in the mounting and orientation of the part so that they are economically usable in a variety of vehicles. High pressure sensors should provide a reliable seal without requiring high torques that can lead to early failure. Part count and weight reduction are also important to reduce assembly costs and total vehicle weight. Current high pressure sensors typically lack in one or more of these aspects.

BRIEF DESCRIPTION OF THE DRAWING

The present invention is illustrated by way of example and not limitation in the accompanying FIGURE, in which like references indicate similar elements, and in which.

Figure 1:
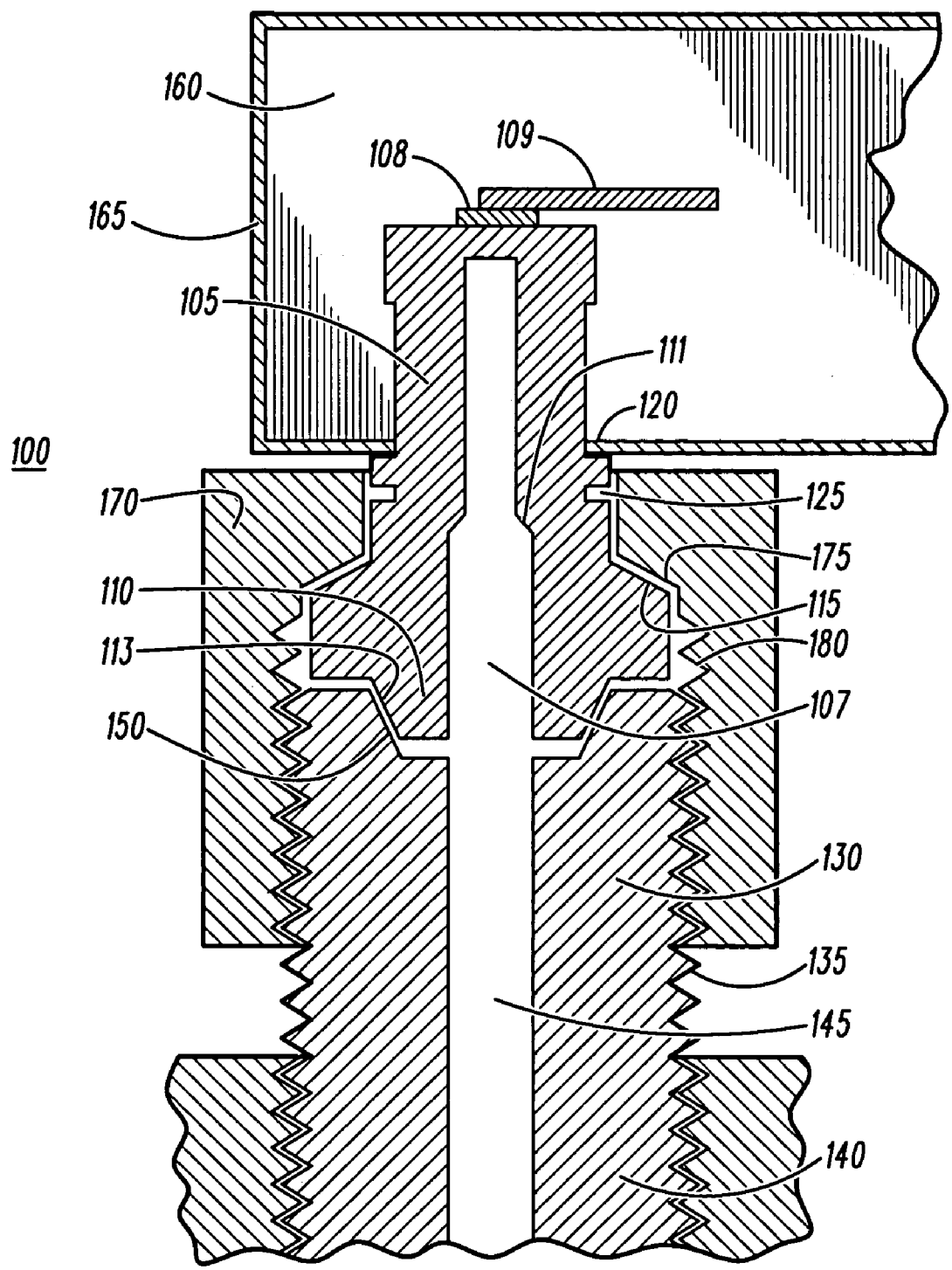
FIG. 1 is a cross sectional view that shows a high pressure sensor in accordance with the preferred embodiment of the present invention.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

The present invention resides primarily in combinations of apparatus components related to the high pressure sensor. Accordingly, the apparatus components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a cross sectional view of a high pressure sensor mounting configuration 100 in accordance with the present invention is shown in accordance with an embodiment of the present invention. The high pressure sensor mounting configuration 100 comprises three parts: a cylindrical pressure sensor cavity 105, an internally threaded collet 170, and a housing 160. The high pressure sensor mounting configuration 100 is intended to conveniently mate with a pressure port 140 of a fluid distribution system of an engine in a vehicle or other situation, such as a fixed generator. The high pressure port 140 has the same port design as other pressure ports typically used currently in many diesel fuel vehicles. The pressure port 140 comprises external threads 135, a cavity 145 that conveys fuel at an operating pressure, e.g., up to approximately 1800 Bar, and a concave conical mating surface 150. The external threads 135 and concave conical shaped mating surface 150 are common with other pressure ports commonly used in diesel vehicles for fuel distribution. The aspect of being designed to mate with the type of pressure ports commonly used in today's diesel vehicles is a desirable aspect to customers who then do not have to make the fuel distribution units (also called fuel rails) with a unique pressure port for the pressure sensor, as must be done for many conventionally available pressure sensors.

The cylindrical pressure sensor cavity 105 is a single piece part that comprises a first bearing surface 115 that has a first angle, a flange 120, a groove 125, a sensing component 108, an electrical contact 109, and a pressure cavity 107. The internally threaded collet 170 is a single piece part that has a second bearing surface 175 that has a second angle, and internal threads 180. The cylindrical pressure sensor cavity 105 also comprises a convex or concave conical open end 110 having a third angle 113 (FIG. 1 illustrates the open end having a convex shape). The housing 160 is a single piece part that comprises a wall 165. The second contact surface 175 of the collet 170 bears on the first surface 115 of the sensor cavity 105 when the collet 170 is threaded onto the pressure port 140, causing the convex conical open end 110 to contact on the concave conical mating surface 150 of the pressure port 140, or, when the open end 110 is concave, the concave conical open end 110 contacts a convex conical mating surface 150 of the pressure port. The first and second angles are designed to provide a line contact between the collet 170 and the sensor cavity 105, and the third angle is designed to provide a line contact between the sensor cavity 105 and the pressure port 140. The first, second, and third angles are designed to provide the line contact even when there is some small amount (e.g., up to one degree) of axial misalignment between the sensor cavity 105 and the pressure port 140. The use of a line contact to transfer the force from the collet 170 to the sensor cavity 105 and the line bearing to achieve the pressure seal at the pressure port 140 allows the pressure seal to be made with substantially less force than those needed in conventional high pressure sensors that have flat packing or washers. The sensing component 108 is a silicon piezo-resistive transducer component that responds to deformation of the top surface of the cylindrical pressure sensor cavity 105 caused by high pressure inside the sensor cavity 105. The strain sensing component couples an electrical signal through the electrical contact 109 to a mating connector (not shown in FIG. 1) and, ultimately, to an engine controller or electrical system. It will be appreciated that other types of sensing components and electrical coupling techniques could be used with the cylindrical pressure sensor cavity 105 to provide many of the benefits of the present invention, but other components and techniques may negatively affect the reliability or number of components that are assembled to form the high pressure sensor 100.

The high pressure sensor 100 of the present invention is easily assembled by placing the collet 170 over the sensor cavity 105 and then affixing the housing 160 to the flange 120, for example by welding or otherwise adhering the wall 165 to the top surface of the flange 120, to capture the collet 170 onto the sensor cavity 105 while still allowing axial movement of the collet 170. The housing may be made of metal or from another material compatible with the environment of the fuel distribution system. Once assembled, the high pressure sensor 100 of the present invention has no loose parts that can be lost, unlike many conventional high pressure sensors. Although a flange is used in the preferred embodiment to affix the housing 160, other configurations may be used to capture the housing 160. For example, the housing might be made of a material (metal, plastic, or other material) that had a cutout for a groove, wherein the material of the housing 160 flexes apart sufficiently while being pushed down over the pressure cavity and snaps into the groove. (When a fixed radial orientation of the housing is important, the groove may have non-grooved segments and the cutout of the housing 160 may be shaped correspondingly). Such alternative configurations may be useful in situations in which the environment of the high pressure sensor is less extreme than vehicular engine mounting environments. The housing 160 is a housing that captures the electrical connector (not shown in FIG. 1) that mates to the electrical contact 109, and also protects the mated connection from aspects of the environment around the high pressure sensor 100.

The groove 125 is used in an embodiment of the present invention in which a strain gauge type of sensing element is permanently bonded to the body of the sensor cavity 105. The groove 125 reduces strain measurement errors that could otherwise occur. It is located above a neck 111 of the sensor cavity 105.

The collet 170, the pressure sensor cavity 105, and the housing 160 are made of stainless steel in the preferred embodiment of the present invention, but other materials could be used in other situations, such as non-vehicular applications (particularly for the housing 160), or lower pressures (particularly for the collet 170 and pressure sensor cavity 105.

It will be appreciated that the high pressure sensor 100 described herein can seal pressures up to at least 1800 Bar, provides for flexibility in the mounting and orientation of the high pressure sensor such that it is economically usable in a variety of vehicles. Due to the line contact types of seal achieved by the high pressure sensor 100 a reliable seal is provided without requiring high torques that can lead to early failure. The part count and weight are both less than in conventional high pressure seals.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having", as used herein, are defined as comprising.

What is claimed is:

1. A high pressure sensor comprising:
    a cylindrical pressure sensor cavity comprising
        a conical open end, and
        a first bearing surface;
    an internally threaded collet comprising a second bearing surface that bears on the first bearing surface when the internally threaded collet is threaded onto a pressure port, causing the conical open end to bear on a conical mating surface of the pressure port; and
    a housing that captures the internally threaded collet on the cylindrical pressure sensor cavity.

2. The high pressure sensor according to claim 1, wherein the cylindrical pressure sensor cavity further comprises a flange to which the housing is affixed.

3. The high pressure sensor according to claim 1, wherein the first contact surface of the cylindrical pressure sensor cavity has first angle and the second contact surface of the internally threaded collet has a second angle that provide a line contact when the internally threaded collet is threaded onto the pressure port, and a third angle of the conical open end provides a line contact to the conical mating surface of the pressure port.

4. The high pressure sensor according to claim 3, wherein a clearance of the internally threaded collet to the cylindrical pressure sensor cavity and the first, second, and third angles are such as to allow a high pressure seal when the pressure sensor cavity is axially misaligned with the pressure port.

5. The high pressure sensor according to claim 1 wherein the housing is an electrical connector housing.

6. The high pressure sensor according to claim 1, wherein the cylindrical pressure sensor cavity has a groove that provides lateral stress relief to the cylindrical pressure sensor cavity.

* * * * *